United States Patent [19]

Yasuo

[11] 4,131,878

[45] Dec. 26, 1978

[54] DETECTOR FOR A PNEUMATIC TIRE

[76] Inventor: Sumi Yasuo, 12-4, 2-chome, Ebisu Minami, Shibuyaku, Tokyo, Japan

[21] Appl. No.: 685,483

[22] Filed: May 11, 1976

Related U.S. Application Data

[63] Continuation of Ser. No. 314,702, Dec. 13, 1972.

[51] Int. Cl.² .............................................. B60C 23/02
[52] U.S. Cl. ..................................... 340/58; 200/61.25
[58] Field of Search ............ 340/58; 200/61.22, 61.25; 307/10 R

[56] References Cited

U.S. PATENT DOCUMENTS

| | | | |
|---|---|---|---|
| 3,602,884 | 8/1971 | Brumbelow | 340/58 |
| 3,614,732 | 10/1971 | Lejeune | 340/58 |
| 3,662,335 | 5/1972 | Fritze | 340/58 |
| 3,665,387 | 5/1972 | Enabnit | 340/58 |

*Primary Examiner*—Alvin H. Waring
*Attorney, Agent, or Firm*—Griffin, Branigan and Butler

[57] ABSTRACT

An information detector for detecting a parameter of a vehicle comprises a pair of coils mounted on a tire and a pair of coils mounted on an automobile frame. An oscillator mounted on the frame supplies a continuous oscillating signal to one of the frame-mounted coils and an indicator is attached to the other frame-mounted coil. For each tire revolution coupling is provided between the two frame-mounted coils by the tire-mounted coils, with a sensor element being mounted between the two tire-mounted coils for modulating the coupling signal in accordance with tire conditions.

7 Claims, 3 Drawing Figures

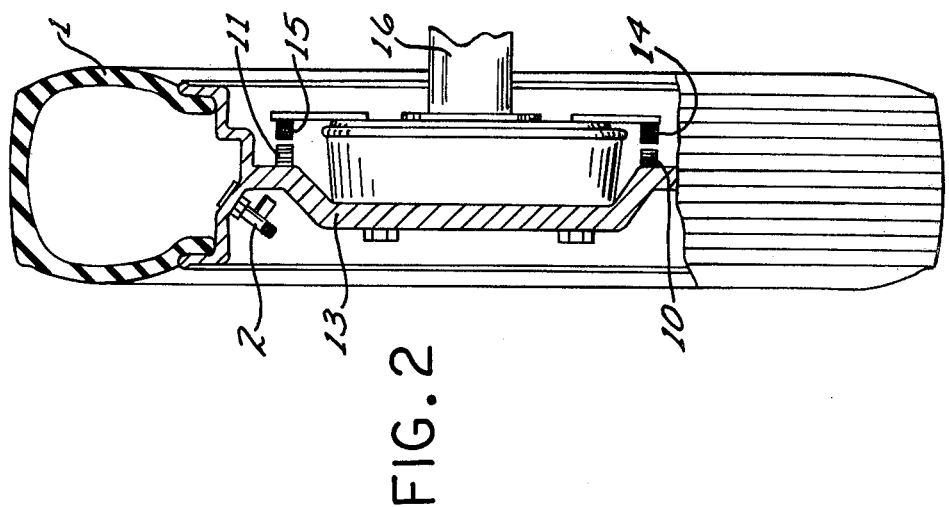
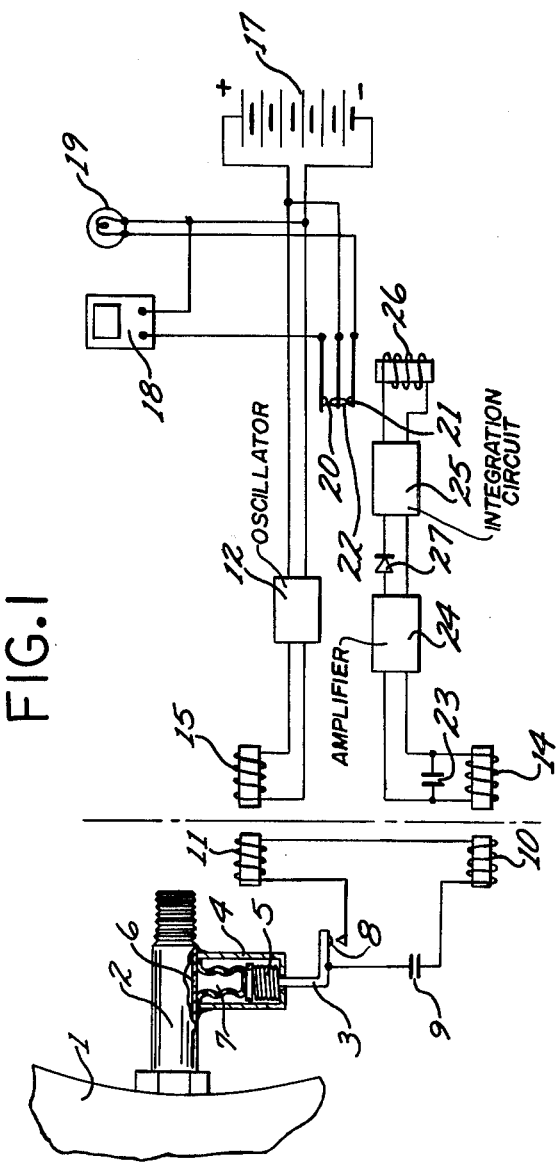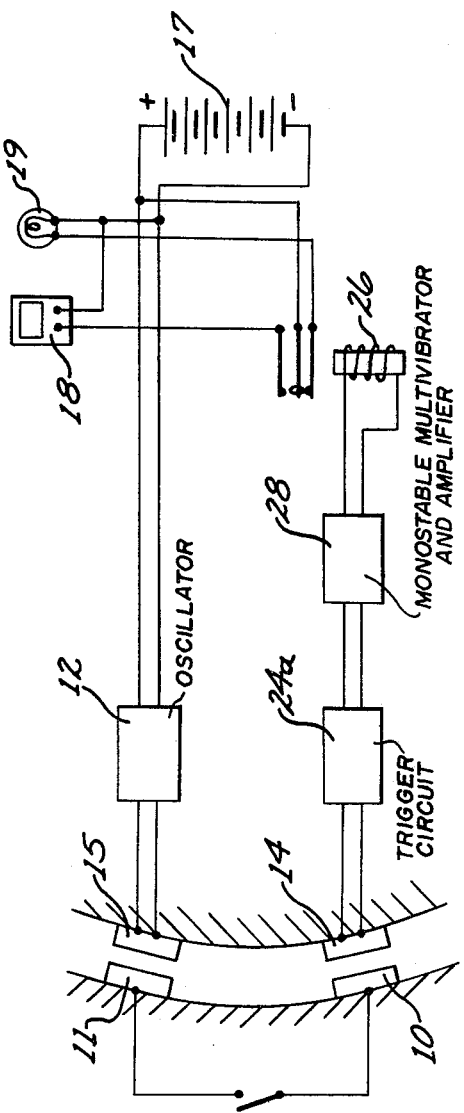

DETECTOR FOR A PNEUMATIC TIRE

This is a continuation, of application Ser. No. 314,702, filed Dec. 13, 1972.

BACKGROUND OF THE INVENTION

This invention relates to a means to detect a leakage in a pneumatic tire or tube, and particularly the tires or tubes on a vehicle. The fact that a tire is either over inflated or under inflated is transmitted to the driver of the vehicle so that this situation may be remedied.

This is a continuation, of application Ser. No. 314,702 filed Dec. 13, 1972.

An object of my invention is to provide an electrical means of detecting either over inflation or under inflation in a tire under pneumatic pressure, and which will detect not only under inflation but also over inflation to the point where a rupture of the tire might occur.

Another object of my invention is to provide an electrical detector which may be mounted in a pneumatic tire and which has a minimum size and weight so that the balance of the tire is not altered.

Still another object of my invention is to provide a novel detector for a pneumatic tire which can be mounted on a standard vehicle tire without greatly altering the present structure of the tire.

Other objects, advantages and features of invention may appear from the accompanying drawings, the subjoined detailed description and the appended claims.

In the drawings:

FIG. 1 is a diagrammatic view of my tire detector.

FIG. 2 is a fragmentary vertical sectional view of a vehicle tire with my detector mounted thereon.

FIG. 3 is a diagrammatic view of a modified detector for a pneumatic tire.

Referring more particularly to the drawings, a pneumatic tire 1 is provided with an air-intake tube 2 through which air under pressure is fed to the tire 1. A finger 3 is movably mounted on a housing 4 which is fixed to the tube 2, as illustrated. A bellows or spring 5 is mounted in the housing 4 and is extended or restricted by air pressure within the tire 1 through the hole 6 and the tube 7. It will thus be evident that variation in air pressure within the tire 1 will expand or contract the bellows or spring 5 and will move the finger 3 to open or close the electrical contact 8. The spring or bellows 5 will normally keep the contact 8 open. The movable contact points 8 are connected to a coil 10 through the condenser 9 and is in turn further connected to a coil 11. The condenser 9 is not always required, but depends upon the frequency output of the oscillator 12. Thus a circuit through the coils 10 and 11 is completed when the switch 8 is closed. The coils 10 and 11 are mounted in the hub 13 of the wheel 1. A pair of fixed coils 14 and 15 are positioned opposite the coils 10 and 11, respectively. Also, there is a slight gap between the coils 10–14 and 11–15. The coils 14 and 15 are mounted on a stationary part of the vehicle with the shaft 16 at the circuit.

I now illustrate the circuit on the chassis side of the vehicle. A DC power source 17 is provided, and the oscillator 12 is interposed between this DC power source 17 and the coil 15. Thus, a loop is formed within the vehicle. Near the driver seat a warning buzzer 18, together with the lamp 19, are provided. One terminal of the buzzer 18, together with the lamp 19, is connected to the negative terminal of the DC power source 17. The other terminal of the buzzer 18 and the lamp 19 is connected to fixed contact points 20 and 21 of a relay. A movable contact point 22 of the relay is connected to the positive terminal of the battery 17.

Terminals of the coil 14 extends to the condenser 23, and the condenser is also connected to the amplifier 24. The pulse integration circuit 25 is connected in series, as shown. The out-put end of the integration circuit 25 is connected to a driving coil 26 of the relay. Furthermore, a diode 27 is interposed between and connected to the amplifier 24 and the pulse integration circuit 25.

In the detector as described above, the oscillator 12 operates and keeps applying signal voltage of the required frequency to the coil 15 continuously. When the relay 26 is not applied with voltage on the driving coil, this causes the movable contact point 22 to contact with the fixed contact point 21 which keeps the light 19 lit. This condition means that the air pressure in the tire is normal. Increase in the air pressure in the tire causes expansion of the flexible tube 7, and subsequent movement of the detecting finger 3. Thus, when the air pressure in the tire 1 increases and reaches the condition of bursting, the detecting finger 3 moves and a contact point or switch 8 closes; thus a loop through the switch 8, the condenser 9, and the coils 10 and 11 is formed. The wheel keeps rotating and the coils 10 and 11 move opposite the coils 14 and 15, respectively, on every revolution of the wheel. Accordingly, electromotive force will be produced in the coil 10 or 11 through the electro-magnetic coupling when they oppose the coil 15 which is kept excited by the signal voltage from the oscillator 12. This electromotive force is stored in the condenser 9 for a while and is applied to the other coil 10 or 11. Thus the coil 14 is also excited since it is connected electro-magnetically with the coil 10 on the chassis side when they oppose each other. The force is amplified in the amplifier 24 and is rectified in the diode 27 which is connected to and integrated by the pulse integration circuit 25. The out-put voltage from this integration circuit 25 is applied to the driving coil 26 of the relay, and thus actuating that relay. The movable contact point 22 is switched so it contacts with the fixed contact point 20. Thus, the lamp 19 is extinguished and the warning buzzer 18 will sound. This sounding of the buzzer 18 informs the driver that the air pressure in the tire 1 reaches a danger point.

In FIG. 3 I have shown a modification of my invention which gives a warning signal when the tire pressure lowers below a definite figure. A signal voltage is induced in a coil 14 which signal voltage is formed into pulses through a trigger circuit 24a, and this circuit is connected to a monostable multivibrator and amplifier 28 to produce rectangular wave currents. The relay 26 is actuated to turn the light 19 on and off and also operate the warning buzzer 18. A pot core coil is used for the coils 10–11 and 14–15 to reduce leakage of the magnetic flux and in order to increase a coupling force between the coils 10–11 and the coils 14–15.

While the principle of detecting the air pressure in a tire has been described in connection with the specific embodiment, it is understood that this information is not limited thereto, and that the heated condition of the tire associated with the puncture and bursting can also be detected. This may be accomplished by substituting the switch 8, as shown in this embodiment, with a positive type semi-conductor the resistance which varies with heat, and by converting a temperature change in the tire into an electric signal. This invention can also be applied to other bodies of rotation such as the screw shaft of a ship. With this latter modification, no power source on the body of rotation is needed. Consequently, there is no battery; only a very few parts are required except a pair of coils on the body of rotation which results in a very simple construction. Further, no lead wire is required; and, therefore, there will be no faulty connections because of rotation. The digital information detection, as illustrated, will provide continuous analogue values by providing a meter indicating an amplitude or phase corresponding to physical values.

Having described my invention, I claim:

1. An information detector for detecting a parameter of a vehicle wheel comprising:
   an electric circuit including an electromagnetic coupling, a first element of which is mounted for rotation with a wheel of a vehicle and a second element of which is fixed;
   said first element comprising a first pair of coils interconnected with one another and said second element comprising a second pair of coils;
   said first and second pairs of coils being arranged to come into opposing relationship at least once during a revolution of the wheel to provide electromagnetic coupling therebetween;
   an oscillator arranged to supply a continuous oscillating signal of substantially fixed frequency to one of said second pair of coils;
   a sensing element arranged to sense a parameter of the wheel connected between the coils and said first pair to control the current flowing between said coils in accordance with said parameter; and,
   indicating means responsive to signals induced in the other of said second pair of coils to provide an indication of changes in said parameter,
   said oscillating signal provided by said oscillator to said one of said second pair of coils remaining continuous with changes in said parameter.

2. An information detector as claimed in claim 1 wherein said first pair of coils are arranged at spaced positions on a circle described by the wheel and said second pair of coils are spaced apart a distance equal to the spacing of said first pair of coils and lying in a plane parallel to and adjacent the plane containing said first pair of coils.

3. An information detector as claimed in claim 1 wherein said sensing element includes a switch arranged to complete a circuit between said first pair of coils when said parameter attains a predetermined value.

4. An information detector as claimed in claim 3 wherein said indicating means is an alarm which is energised when said parameter attains said predetermined value.

5. An information detector as claimed in claim 1 wherein said sensing element varies the current flowing between the first pair of coils in accordance with the value of said parameter.

6. An information detector as claimed in claim 5 wherein said indicating means is a meter arranged to indicate the value of said parameter.

7. An information detector as claimed in claim 1 wherein said sensing element is arranged to sense the pressure of the tire on the wheel.

* * * * *